Figure 11:
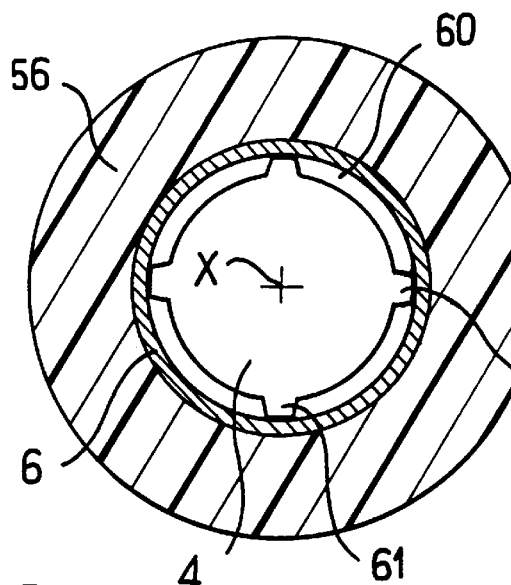

United States Patent [19]
Secher

[11] Patent Number: 6,009,907
[45] Date of Patent: Jan. 4, 2000

[54] FLEXIBLE STIFFENER

[75] Inventor: Philippe Secher, Deville-Les-Rouen, France

[73] Assignee: Coflexip, France

[21] Appl. No.: 08/753,223

[22] Filed: Nov. 22, 1996

[30]     Foreign Application Priority Data

Nov. 29, 1995 [FR] France ................................. 95 14114

[51] Int. Cl.[7] .................................................. F16L 57/00
[52] U.S. Cl. .......................... 138/110; 138/109; 138/38; 285/41
[58] Field of Search .................... 138/109, 110, 138/112, 114, 38; 285/41

[56]           References Cited

U.S. PATENT DOCUMENTS

| 3,004,779 | 10/1961 | Cullen et al. | 285/256 |
|---|---|---|---|
| 3,062,564 | 11/1962 | Stehle et al. | 285/41 |
| 3,831,635 | 8/1974 | Burton | 138/110 |
| 4,017,102 | 4/1977 | Henderson | 285/41 |
| 4,116,009 | 9/1978 | Daubin | 138/112 |
| 4,121,858 | 10/1978 | Schulz | 285/41 |
| 4,691,740 | 9/1987 | Svetlik et al. | 138/109 |
| 4,774,872 | 10/1988 | Creedon | 138/155 |
| 5,526,846 | 6/1996 | Maloberti | 138/109 |

FOREIGN PATENT DOCUMENTS

| 0296056 | 6/1988 | European Pat. Off. . |
|---|---|---|
| 9212376 | 7/1992 | WIPO . |
| 9409245 | 4/1994 | WIPO . |

Primary Examiner—James F. Hook
Attorney, Agent, or Firm—Ostrolenk, Faber, Gerb & Soffen, LLP

[57]         ABSTRACT

Stiffener designed for fitting to a piping consisting of a flexible conduit for use in a marine environment, carying a hot fluid, the said stiffener comprising a flexible casing located at least partially over the said flexible conduit, having structure (15) for dissipating the heat at the interface between the stiffener and the flexible conduit (3).

23 Claims, 7 Drawing Sheets

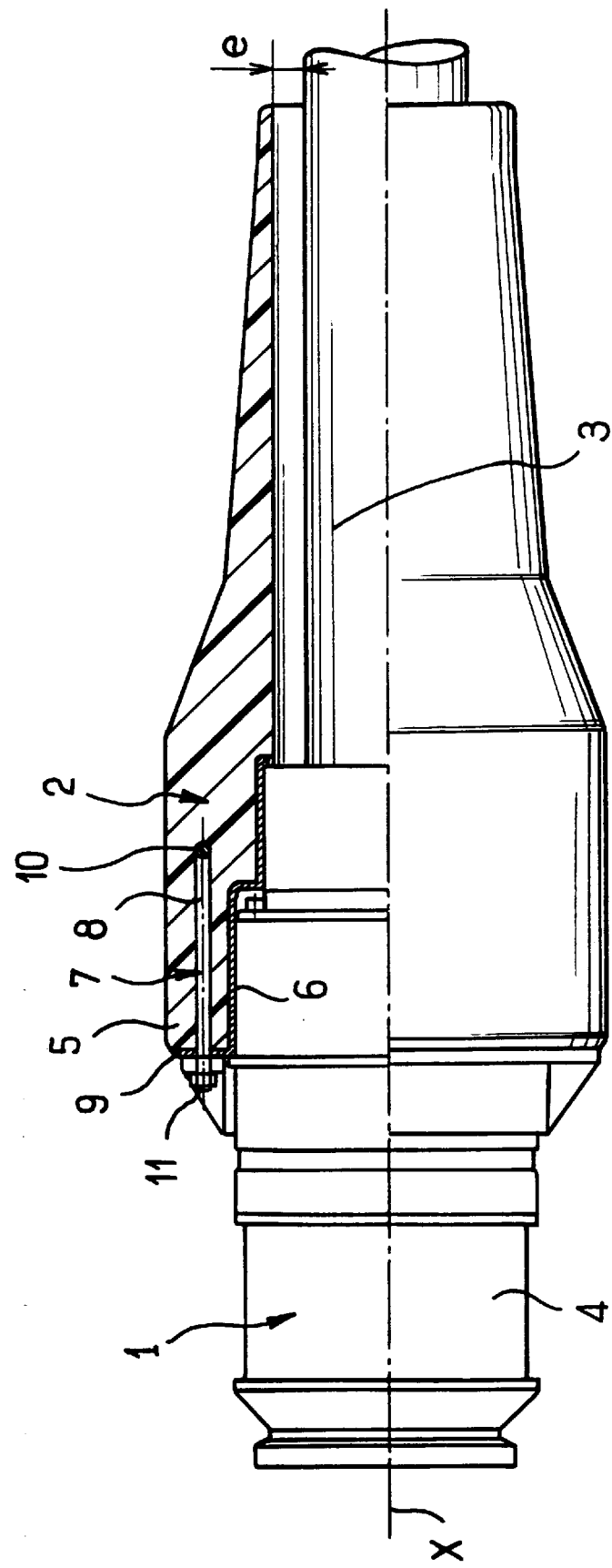
FIG_1 - ETAT DE LA TECHNIQUE

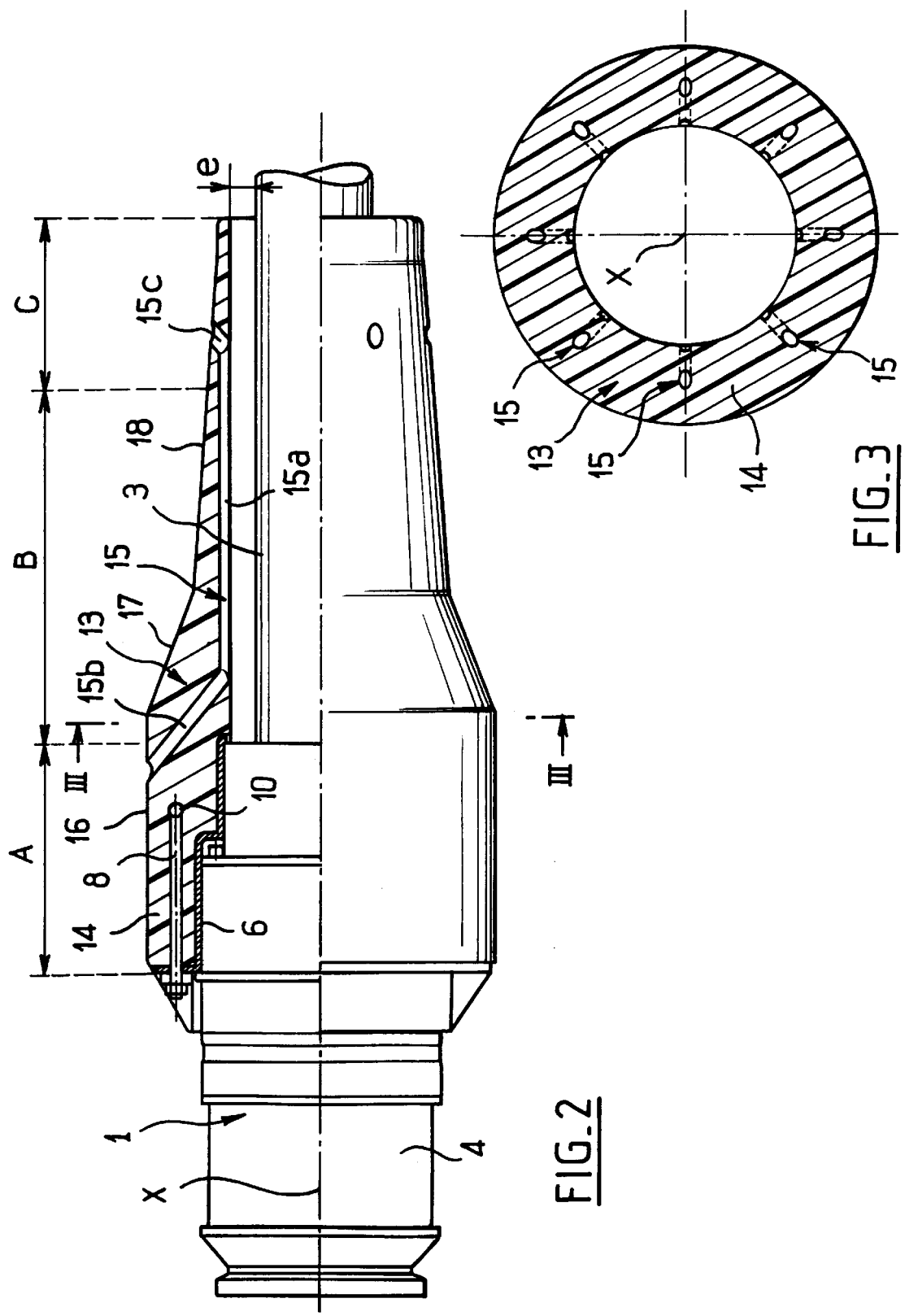

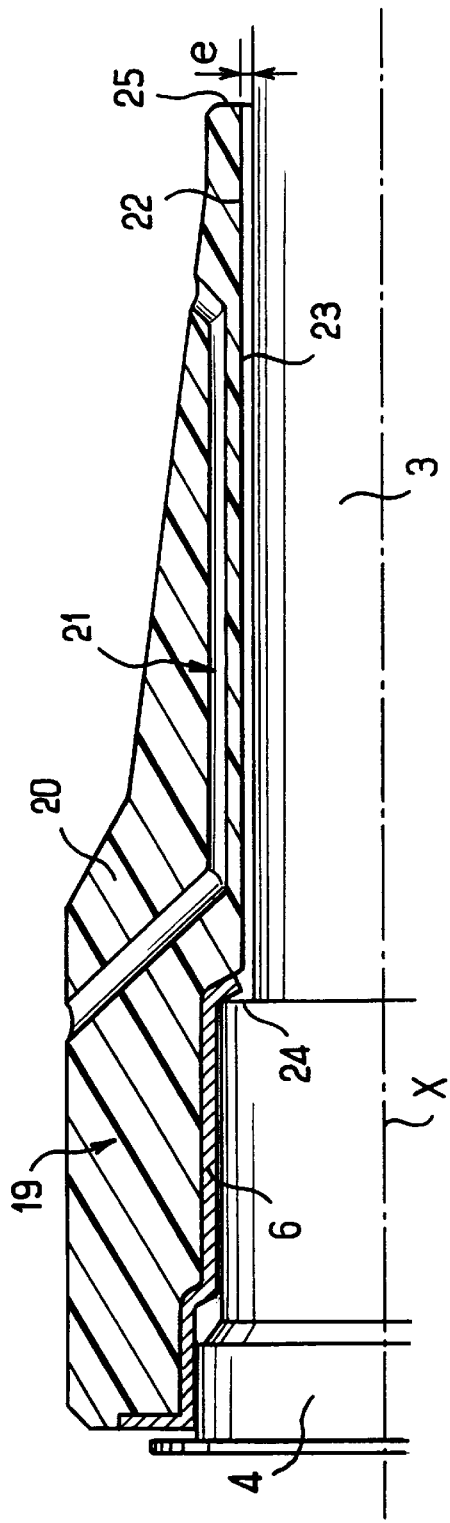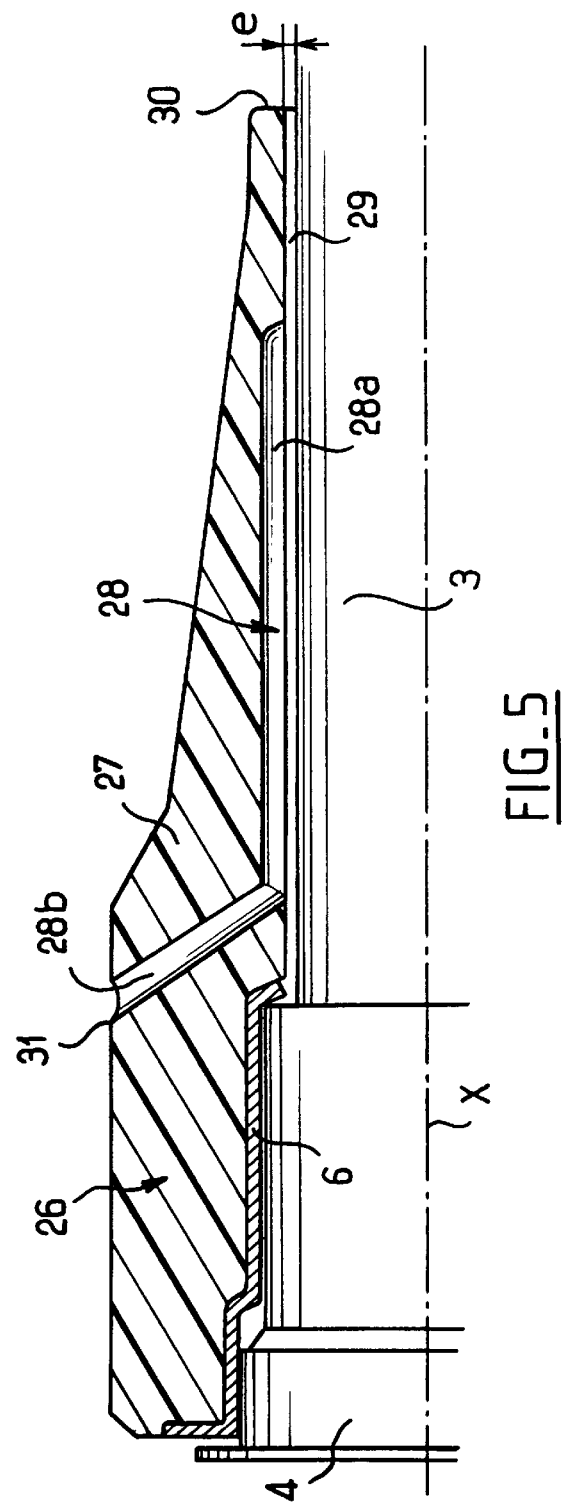

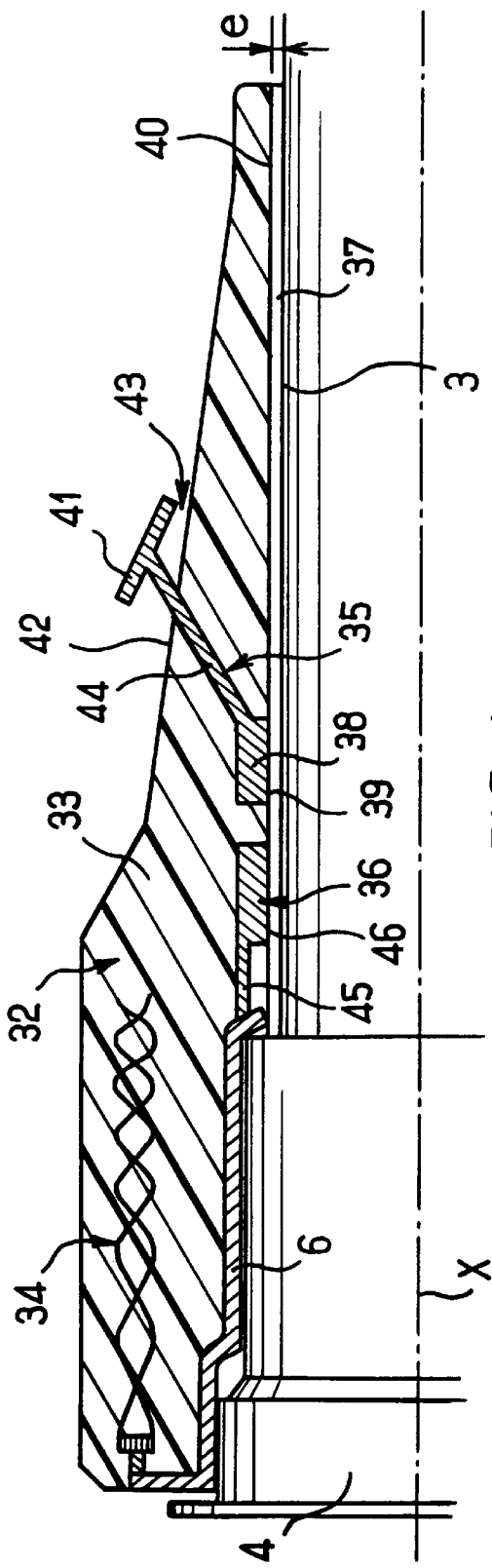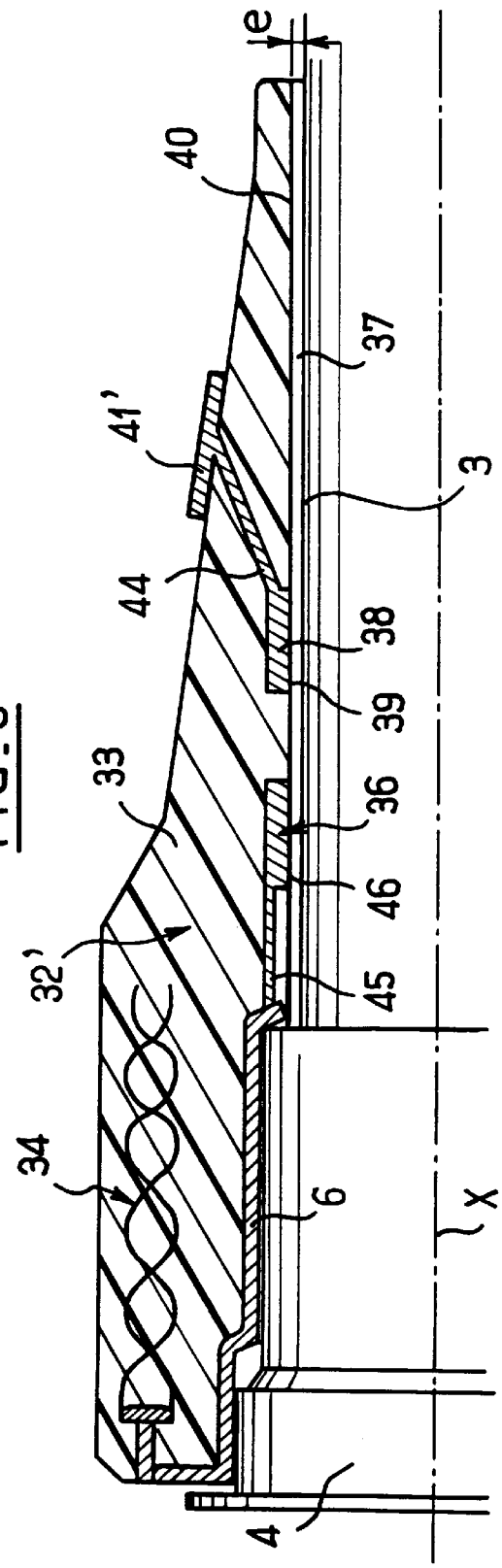

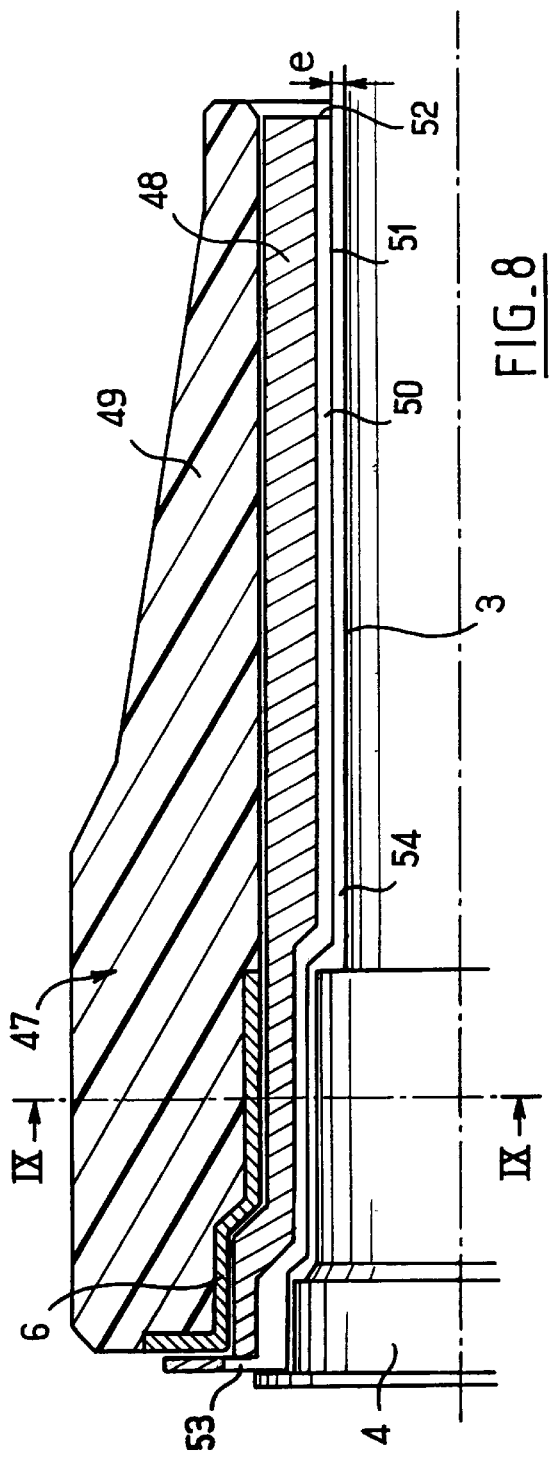
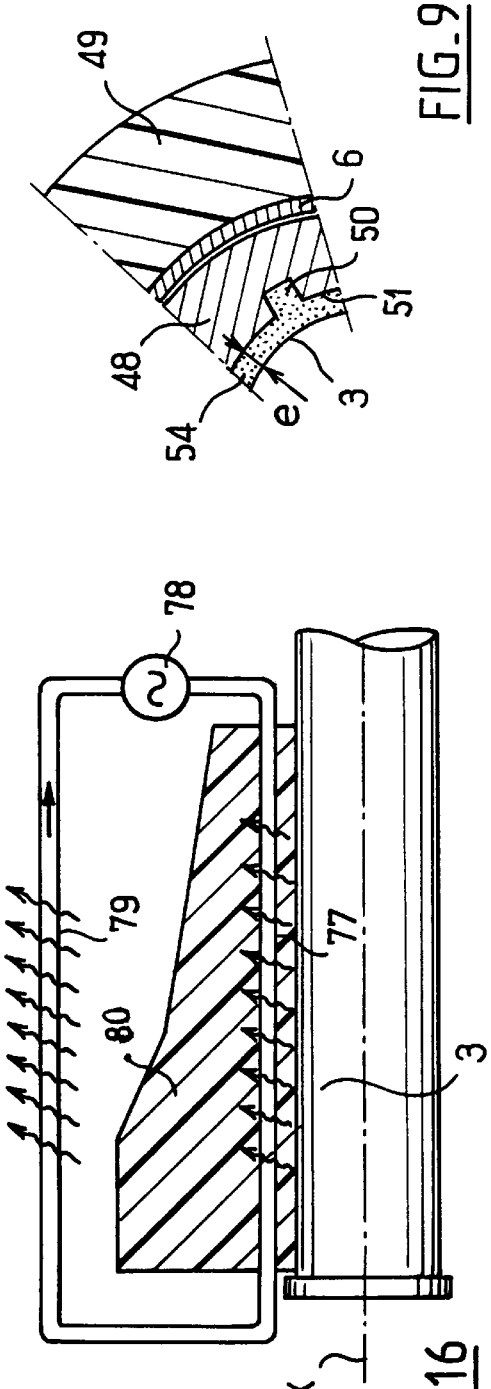

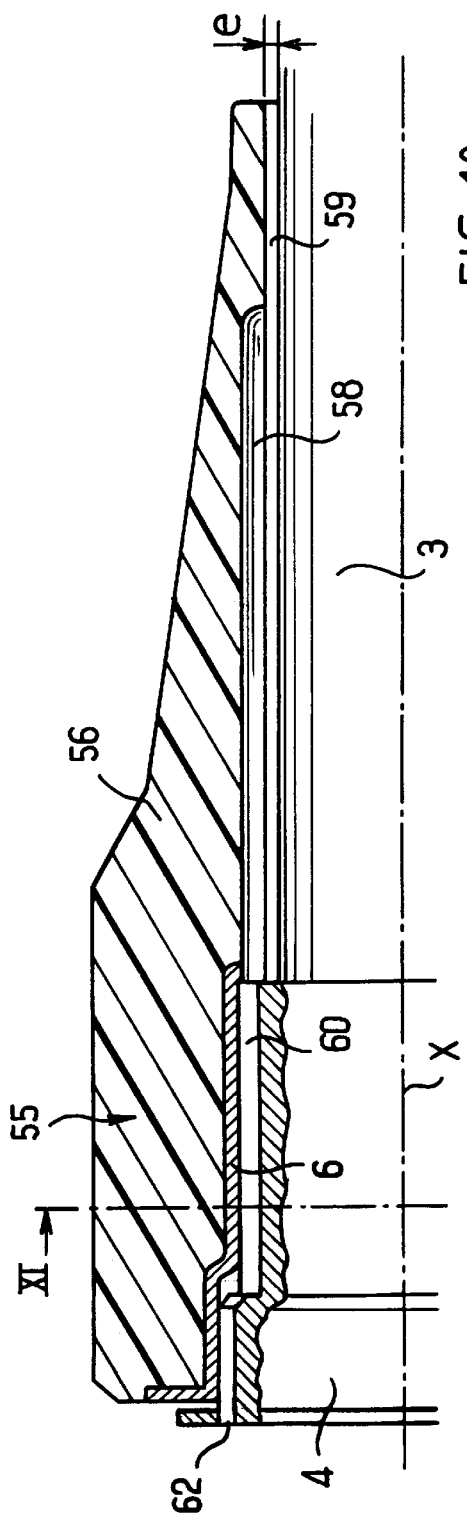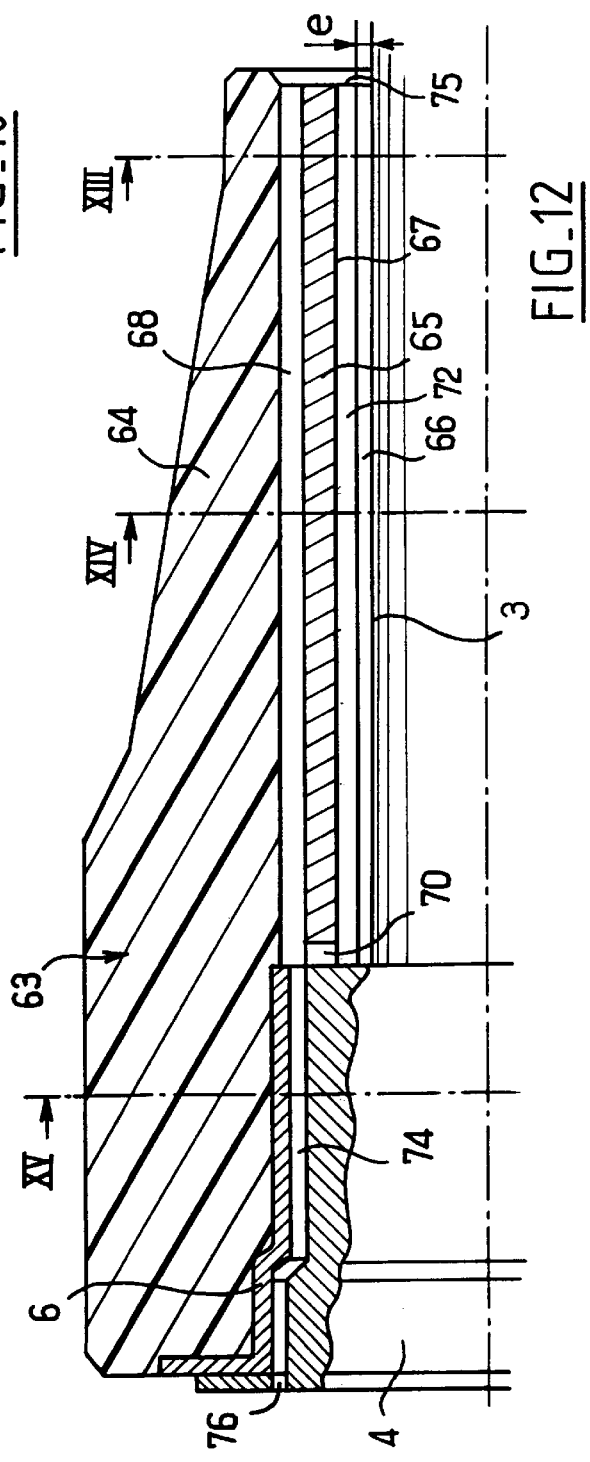

FLEXIBLE STIFFENER

The present Invention concerns a stiffener for flexible piping for use in a marine environment, and more especially the stiffener is designed for fitting to a pipe conveying hot fluid at a temperature of above 80° C., for example, a hydrocarbon feed pipe running from a sub-sea well-head to a floating oil platform.

The flexible pipes described above and in the form in which they are manufactured in long lengths by the applicant Company comprise a flexible conduit composed of one or more layers which are usually in a crushproof metal material, one or more polymer layers to provide imperviousness and which have heat insulation properties, reinforcing wires usually in a metal material coiled in the form of overlapped layers affording tensile strength, and a polymer external protective coating.

These pipes may be damaged if the flexible pipe is bent through a tight radius.

It is recognised that in order to pre-empt this risk, the pipe should be fitted with a stiffener comprising a flexible casing in moulded polyurethane, designed to impart a minimum curve radius to the portion of the flexible conduit likely to be subjected to flexion leading to the risk of damage to the pipe.

This portion could be, for example, the end of the flexible conduit joined to the end fitting on the pipe providing the coupling between the said pipe and the floating oil platform.

The current lifespan for the pipes described above is in the region of fifteen to twenty years, during which the stiffener must retain its stiffness in order to fulfil its function.

However, polyurethane has been found to age due to hydrolysis on contact with sea water, resulting in a prejudicial loss of stiffness in the stiffener.

One proposal to remedy this drawback consisted in increasing the thickness of the stiffener in order to strengthen it. However, this increase in the thickness of the stiffener (which is already heavy) leads to a higher cost and poses in particular moulding feasibility problems, due to the fact that it is impossible to mould polyurethane pieces weighing over two tonnes.

Another solution has been proposed, consisting in using a polymer of a different composition and having a higher hydrolysis resistance. However, this solution means either that the composition of the polyurethane be modified or that plastic materials be used, which are less common than polyurethane and therefore are more expensive. In addition, altering the composition of the polyurethane or the choice of a replacement plastic material should not engender any downgrading of the stiffener mechanical properties.

Another proposal examined reducing the surface area of the stiffener exposed to seawater, using seals fitted to the stiffener's axial ends, in order to prevent seawater from reaching the interface between the stiffener and the flexible conduit.

However, this solution is not very reliable in practice, insofar as the stiffener is subjected to major and repeated elastic deformation due to swell, which may locally distort the seal or its seat and enable ingress of water or humidity.

The objective of this Invention is to propose a new stiffener whose efficiency is improved in terms of lifespan in a marine environment, without this improvement nevertheless leading to a notable increase in the weight or manufacturing cost of the stiffener, nor in a notable downgrading of its mechanical properties.

The Invention does this due to the fact that the stiffener incorporates the means of dissipating the heat at the interface between the stiffener flexible casing and the flexible conduit.

The term "interface" should be understood in the wider sense as designating the annular area between the flexible conduit and the stiffener flexible casing.

The inventors found that by limiting the stiffener temperature at the interface with the flexible conduit, the rate of hydrolysis of the polyurethane was considerably reduced, and consequently its ageing was reduced.

The temperature at the interface is in fact, due to the absence of a means of limiting the heat on it, relatively high due to the length of the stiffener and the temperature of the fluid running through the flexible conduit, in spite of the longitudinal heat conduction of the flexible conduit's metal reinforcing wires, as the wires are insufficient to dissipate the heat at the interface between the flexible conduit and the stiffener by conduction. It is therefore possible, with this Invention, to significantly reduce the temperature at the interface and in this way to delay stiffener ageing.

In a preferred version of the Invention, the said means of dissipating the heat comprise at least one water circulation channel inside the stiffener.

The water circulation channel is capable of retaining its total effectiveness over time, in spite of immersion in a marine environment and the risks of the channel blocking due to marine animal accretions or the accumulation of organic matter.

One explanation for this resides in the fact that if blockage of the water circulation channel inside the stiffener commences, the temperature of the water in the channel rises to over 40° C., the maximum temperature tolerable by underwater fauna, which are thus eliminated from the channel. If, nevertheless, the channel cross-section available for the flow is reduced, the water temperature will increase and, due to the thermo-syphon effect, the flow through the channel will increase, thus limiting the increase in temperature.

In one special version of the Invention, a number of water circulating channels run through the stiffener, the distance of which from the inside surface of the stiffener over the flexible conduit is smaller than or equal to the diameter of the said channels.

Ideally, the distance between the water circulation channels is smaller than or equal to twice their diameter and preferably equal to their diameter.

Ideally, each water circulation channel leads to the stiffener internal surface over the said flexible conduit.

In a special version of the Invention, there is an annular gap of between 2 and 16 mm at the interface between the stiffener and the flexible conduit.

In a special version of the Invention, the said means of dissipating the heat at the interface between the stiffener and the flexible conduit comprise at least one metal insert capable of conducting the heat from the radially internal area of the stiffener to the exterior. Ideally, the said insert comprises an external fin to enable thermal energy dissipation by convection and/or radiation.

In a special version of the Invention, the said means of dissipating the heat comprise an intermediate part located between the stiffener flexible casing and the said flexible conduit.

In a special version of the Invention, the said means of dissipating the heat at the interface between the stiffener and the flexible conduit incorporate a means for establishing the forced circulation of a cooling fluid between an energy dissipation component on the outside of the stiffener and a part used to evacuate the energy at the interface with the flexible conduit.

The application of the Invention is advantageous when the temperature of the hot fluid inside the said flexible conduit is between 80 and 200° C. and the stiffener length is over or equal to 1.5 m, and more especially when it is between 2 and 3 meters.

A further objective of the Invention is to provide a flexible pipe fitted with a stiffener as described above.

Figure 13:
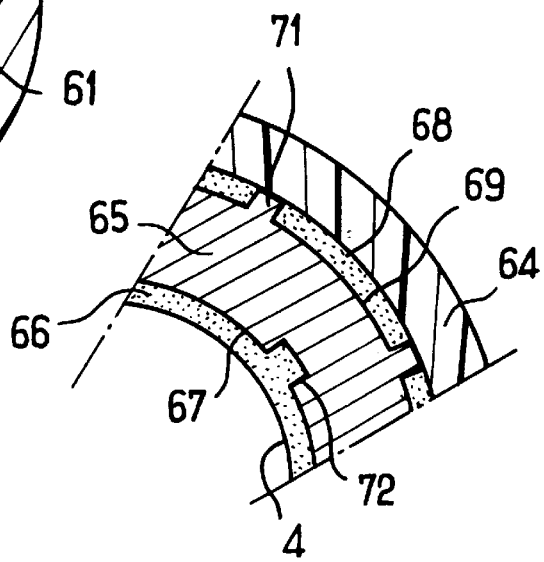
Figure 14:
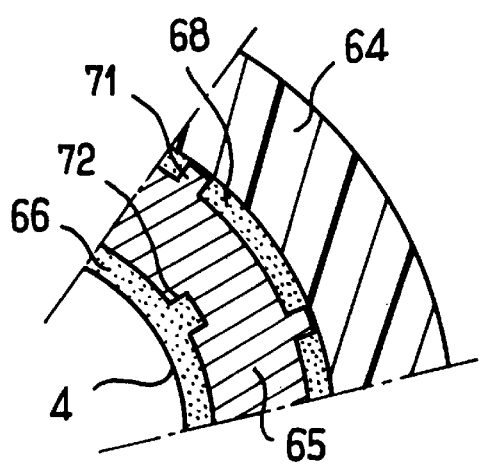
Figure 15:
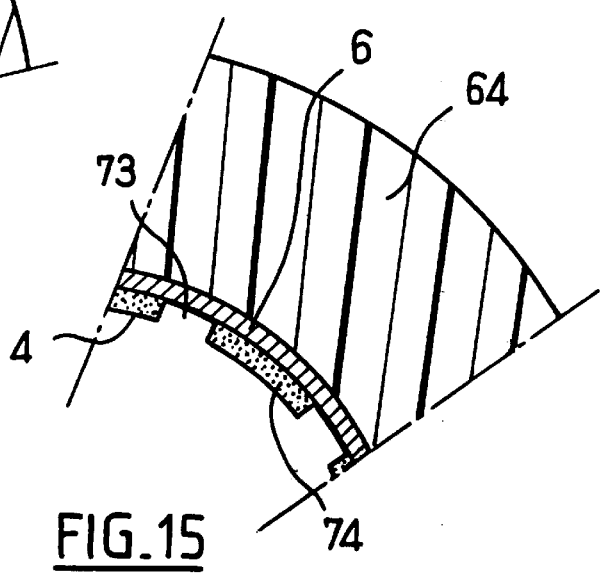

Other characteristics and advantages of this Invention will be brought to evidence by reading the detailed description below, examples of nonlimitative versions of the Invention and on examination of the appended drawing, in which:

FIG. 1 is a schematic view, along the longitudinal cross-section, of a flexible pipe fitted with a stiffener in compliance with the state of the art, FIG. 2 is a schematic view, along the longitudinal cross-section, of a stiffener in compliance with a first version of the Invention, FIG. 3 is a schematic view, along the longitudinal partial cross-section, along cross-section line III/III in FIG. 2, FIG. 4 is a schematic view, along the longitudinal cross-section conforming to a second version of the Invention, FIG. 5 is a schematic view, along the longitudinal cross-section, of a stiffener conforming to a third version of the Invention, FIG. 6 is a schematic view, along the longitudinal cross-section, of a stiffener conforming to a fourth version of the Invention, FIG. 7 is a schematic view, along the longitudinal cross-section, of a stiffener conforming to a fifth version of the Invention, FIG. 8 is a schematic view, along the longitudinal cross-section, of a stiffener conforming to a sixth version of the Invention, FIG. 9 is a transverse partial cross-section, along line IX/IX in FIG. 8, FIG. 10 is a schematic view, along the longitudinal cross-section, of a stiffener conforming to a seventh version of the Invention, FIG. 11 is a transverse cross-section, schematic view, along line XI/XI in FIG. 10, FIG. 12 is a schematic view, along the longitudinal cross-section, of a stiffener conforming to an eighth version of the Invention FIGS. 13, 14 and 15 are the respective, partial and schematic transverse cross-sections, along lines XIII/XIII, XIV/XIV and XV/XV in FIG. 12, and FIG. 16 is a schematic view, in longitudinal cross-section, of a stiffener conforming to a ninth version of the Invention.

FIG. 1 shows a pipe 1 fitted with a stiffener (2) recognised as such and described for example in international publication WO 92/12376 by the Applicant.

Pipe (1) comprises a flexible conduit (3) fitted to a rigid connecting endpiece (4). Stiffener (2) imposes a minimum curve radius on flexible conduit (3) and avoids damage to the latter due to bending. The length of stiffener (2) is determined by the length of the portion of the conduit whose curve is to be restricted. In practice, the length of stiffener (2) may attain three meters.

In the example described, stiffener (2) has a flexible casing (5) in moulded polyurethane, with a Shore A hardness of between 60 and 95, and over a portion of the inner surface a metal insert (6) which marries the external shape of endpiece (4). The insert (6) is fixed to a reinforcement (7) anchored in the flexible casing (5) of stiffener (2). This reinforcement (7) is composed, in the example described, by a number of tie-rods (8) connecting the end (9) of the insert (6) acting as a clamp and locking ring (10). The tie-rods (8) run parallel to the longitudinal X axis from endpiece (4) and have a threaded end (11) which protrudes beyond flange (9) in order to allow bolting of stiffener (2) to the flange formed on endpiece (4).

The reinforcement (7) increases the bending rigidity of the flexible casing (5) and contributes greatly to the resistance to axial traction and compression loads exerted on the stiffener when conduit (3) is subjected to bending.

By way of information, the flexible casing (5) may stretch by 10 to 15% under the maximum imposed load and may undergo an elongation of 400% without breaking.

The flexible casing (5) is in moulded polyurethane, moulded round insert (6) (which affords reinforcement of the flexible casing (5) over endpiece (6) due to the polyurethane shrinkage during curing). The stiffener is fitted to the pipe by sliding it over flexible conduit (3). The stiffener flexible casing (5) has an annular gap of size e in relation to flexible conduit (3).

FIGS. 2 and 3 show a stiffener (13) conforming to a first version of the Invention. This stiffener (13) has a flexible casing (14) in moulded polyurethane, traversed by a number of water circulation channels (15). The channels (15) are incorporated, in the example described, during moulding of the flexible casing (14) using lifting-core moulding techniques. As a variant, fused cores may be used, or any other recognised technique.

The stiffener (13) may be broken down axially into three successive sections, referenced A, B and C working back from endpiece (4). Section A practically corresponds to the part of the stiffener (13) which overlaps endpiece (4) and its external radial limits represent a surface (16) which is generally a revolution cylinder about the longitudinal axis X of endpiece (4). The outer limits of sections B and C are surfaces (17) and (18) which taper away from section A, with the angle at the apex of surface (17) greater than that of surface (18). Section C is the section on which the stiffener is relatively thin by comparison with the thickness along section A in the part of section B, which is adjacent to section A.

Section A is the section of the stiffener (13) which fits in endpiece (4), and the intermediate section B constitutes the stiffener "active" section, in that it prevents excessive bending of flexible conduit (3).

The above-mentioned channels (15) are for the most part fed through the intermediate section B, in which the temperature at the interface with flexible conduit (3) is likely to be the highest. By way of information, the maximum thickness of the stiffener in section B may be at least 10 times that of the flexible conduit external polymer coating which provides protection against external aggression for the flexible conduit's internal layers.

In the Invention version described, each channel (15) has a main portion (15a) which has a transverse semi-circular cross-section running parallel with the X axis, along the outer surface of the flexible conduit, and opening onto the outside of the plastic casing 1' of stiffener (13) in two end portions angled along the X axis at points (15b) and (15c) respectively. Portion (15b) opens out more or less at the end of endpiece (4) adjacent to flexible conduit (3). Portion (15c) opens out in the thin section C of the stiffener. By way of information, the diameter of channels (15) may be in the order of 50 millimeters.

In the example described, eight channels (15) run through the stiffener casing located at equidistant angles around the longitudinal axis (2), as shown in FIG. 3.

The temperature at the interface with the flexible conduit can be maintained at below 50° C., thanks to the Invention, which considerably reduces the polyurethane rate of hydrolysis and delays downgrading of the stiffener mechanical properties.

FIG. 4 shows a stiffener (19) in conformity with a variant of the Invention. The stiffener (19) does not have a reinforcement (8), (10), to illustrate the fact that the Invention also applies to reinforcement-less stiffeners. The stiffener flexible casing, reference number (20), contains a number of cooling channels (21) located at an angle round longitudinal axis X. However, unlike the previously described stiffener, channels (21) do not partly open out onto the internal surface (22) of stiffener (19) over flexible conduit (3) but extend some distance from this internal surface (22).

There is an annular clearance (23) with a gap e at the interface between the flexible casing (20) of stiffener (19) and flexible conduit (3). This annular clearance (23) is extended axially from the end (24) of endpiece (4) adjacent to flexible conduit (3) to the end (25) of the thinner part of the stiffener (19), and enables fitting of stiffener (19) by sliding it along flexible conduit (3).

The axial plane cross-sections of channels (21) are generally similar in shape to those of channels (15) described above. It will be seen that the channels (21) run through the stiffener flexible casing close to the internally radial surface (22) so that they cool the internally most radial part of the stiffener flexible casing. Preferably, as shown, the distance separating the surface (22) and the channels (21) is smaller than or equal to the diameter of the channels.

FIG. 5 shows an axial cross-section of a stiffener (26) conforming to a variant of the Invention. This stiffener (26) comprises a flexible casing (27) through which a number of cooling channels (28) run distributed at an angle around longitudinal axis X. There is an annular clearance (29) with a gap e at the interface between stiffener (26) and flexible conduit (3) over the portion extending axially from endpiece (4) up to the reduced-thickness section of stiffener (26). Each channel (28) has a main portion (28a) running parallel to the longitudinal axis X and composed of a groove opening out towards the annular gap (29). Each main portion (28a) meets endpiece (4) at its adjacent end, with a part of the end (28b) opening out at (31) onto stiffener (26) external surface, close to the end of endpiece (4) adjacent to flexible conduit (3). The thinner end of the stiffener is not irrigated by the main portions (28a).

In this example of the Invention, circulation of the cooling water is through the annular gap (29) between the thinner area at the end of the stiffener and flexible conduit (3), through the main portions (28a) of channels (28), and through the end portions (28b) extending obliquely in relation to longitudinal axis X.

FIG. 6 shows a stiffener (32) comprising a flexible casing (33) fitted with a reinforcement (34) composed of braided wires.

Metal inserts (35) and (36) are incorporated into the flexible casing (33) in order to act as heat exchangers enabling transfer of heat from the interface with flexible conduit (3), to the exterior.

The metal insert (35) has at one end a radial internal part (38) which has a surface (39) forming part of the internal surface (40) of the flexible casing (33) of stiffener (32) and at the other end a radial external part constituting a cooling fin (41), designed to dissipate the heat by convection and radiation to the exterior environment. More specifically, this fin (41) extends a distance over the external surface (42) of the flexible casing (33) of stiffener (32) in order to form a gap (43) with the latter and dissipate the heat through its two main sides. The interior part (38) is connected to the fin (41) via an intermediate part forming a heat conduction bridge (44).

Metal insert (36) has a heat conduction bridge (45) connected to one end of the insert (6) fitted to endpiece (4) in order to transfer the heat to insert (6). The latter thus contributes to cooling the inner surface of the flexible casing (33) of stiffener (32). At the other end of the heat conduction bridge (45), insert (36) has a radial internal part which has a surface (46) which constitutes part of the internal surface (40) of the flexible casing (33) of stiffener (32) and which acts as a radiation element in order to absorb the heat at the interface with flexible conduit (3).

FIG. 7 shows a stiffener (32') constituting a variant of the stiffener (32) shown in FIG. 6. This variant of the Invention differs from the previous one in that the fin, reference (41') is flat against the outer surface of the stiffener. It will be understood that in this version the exchange of heat with the outside is reduced insofar as it is only over one main side of fin (41').

FIG. 8 shows a stiffener (47) comprising an intermediate fitting (48) located between the flexible casing (49) of the stiffener and flexible conduit (3).

In this variant, the channels (50) are on the radial internal surface (51) of the intermediate fitting (48) in order to enable fluid circulation between the two axial ends (52), (53) of the stiffener. The channels (50) are equidistant at an angle around the longitudinal axis X and extend longitudinally over the whole length of the intermediate fitting (48).

The flexible casing (49) of stiffener (47) is in the example described force-fitted over the intermediate fitting (48) but in a variant version it may be maintained over the latter by any method recognised by the industry, for example using a screw attaching the insert (6) and the intermediate fitting (48).

The intermediate fitting (48) is manufactured from a hydrolysis-resistant material and has the necessary flexibility to enable it to follow the bending of flexible casing (49) of the stiffener while preferably withstanding any crushing between flexible conduit (3) and the flexible casing (49) of the stiffener.

The intermediate fitting (48) may thus be manufactured in a polymer such as high density polyethylene or EPDM, for example.

As can be seen from examination of FIGS. 8 and 9, there is an annular gap 54 e between flexible conduit (3) and intermediate fitting (48). This gap enables fitting of the intermediate fitting (48) over flexible conduit (3).

Where an intermediate fitting (48) is used, the flexible casing (49) of stiffener (47) may retain its integrity, which is favourable in mechanical terms due to the fact that the channels described in previous variants constitute special areas in which mechanical stresses may be concentrated and cause cracking, thus damaging the stiffener flexible casing. Use of an intermediate fitting also simplifies the flexible casing moulding operation, which is carried out without the cores used for the channels described in the variants shown in FIGS. 2, 4 and 5.

In the above-described variants, the size e of the annular gap is chosen in order to enable the stiffener to be slip-fitted, and its value is preferably between 2 and 16 mm, determined for example by taking 1 mm of gap per inch of flexible conduit outer diameter.

FIG. 10 shows a stiffener (55) conforming to another example of the Invention variants. This stiffener (55) comprises a flexible casing (56) in polyurethane moulded over a metal insert (6). Water circulation channels (58) are located on the inner surface of the flexible casing (56) and are in the form of longitudinal grooves opening out in the direction of the flexible conduit and extending axially between endpiece (4) and the thinner section of the stiffener. Endpiece (4) has round its perimeter longitudinal grooves (60) which enable water to flow between endpiece (4) and insert (6).

In the example described, water circulation is through the annular gap (59) located between the thinner section of the flexible casing (56) and flexible conduit (3), along channels (58) and grooves (60), to open out at orifices (62) at the axial end of stiffener (55) adjacent to endpiece (4). As can be seen from examination of FIG. 11, the internal surface of insert (6) is in contact with the ribbing (61) formed around the perimeter of endpiece (4) and forming between them grooves (6).

FIG. 12 shows a stiffener (63) conforming to an example of another version of the Invention. This stiffener (63) has a flexible casing (64) in polyurethane moulded over a metal insert (6). The flexible casing (64) is force-fitted over an intermediate fitting (65) extending axially from the thinner end of the flexible casing (64) up to endpiece (4). This intermediate fitting (65) is manufactured from a material chosen for its mechanical properties and its hydrolysis resistance, in the same way as intermediate fitting (48) in the example of the version described in FIG. 6. Longitudinal channels (72) and (68) are made respectively in the radially internal and radially external sides of the intermediate fitting (65) as shown in FIGS. 13 and 14. More precisely, the channels (72) are composed of flutings in the radially internal surface (67) of intermediate fitting (65) and the channels (68) are made between the ribbings (71) forming a protrusion on the radially external surface (69) of the intermediate fitting (65). Communicating passages (70) are made in the axial end of intermediate fitting (65) adjacent to endpiece (4). These communicating passages (70) enable fluid to flow between channels (72) and channels (68).

In the example described in FIG. 12, water circulation is from one axial end (75) towards the opposite axial end of the stiffener, through channels (68), through channels (72) and the communicating passages (70), and through the fluid channels (74) around the perimeter of endpiece (4), between the latter and the radially internal surface of insert (6). Water circulation is therefore on both of the main sides of intermediate fitting (65).The fluid channels (74) are formed between the ribbings (73) in contact with the radially internal surface of insert (6), as shown in FIG. 15.

There is an annular gap (66) between the radially internal surface (67) of intermediate fitting (65) and flexible conduit (3) to enable slip-fitting of intermediate fitting (65).

Naturally, the Invention is not limited to the variant examples which have just been described.

Without leaving the scope of this Invention, we may limit heating at the interface between the stiffener and the flexible conduit using forced circulation of a cooling fluid, which is illustrated very schematically in FIG. 16. In this Figure, the flexible casing (80) of the stiffener is traversed by conduit (77), carrying a liquid coolant circulated by a pump (78). The conduit (77) is linked thermally to a radiating element (which is not shown in order to keep the diagram clear), which absorbs the heat inside the stiffener flexible casing around the internal surface of the flexible casing (80). The liquid coolant is fed to the other radiating element (79) and is cooled by heat exchange with the external environment.

This device enables variations in the temperature of the external environment to be overcome, since they affect the efficiency of the cooling at the interface between the stiffener and the flexible conduit.

This type of device also provides for efficient cooling where the stiffener may only be partly submerged, or is not yet submerged but is subjected to a humid atmosphere.

The Invention also applies to stiffeners which have a flexible casing manufactured from an elastomer material other than polyurethane but sensitive to hydrolysis.

The material chosen for manufacture of the stiffener flexible casing ideally has a composition appropriate to preventing attachment of living matter, such as a chlorous compound, for example.

In a variant of the Invention not shown here, it is possible to have a sufficient gap between the flexible conduit and the stiffener flexible casing to provide the required cooling, by inserting flexible spacers between the flexible conduit and the stiffener flexible casing. Water circulation channels are then formed along these spacers by local separation of the parts between the flexible conduit and the stiffener flexible casing. This affords water flow by opening the axial ends of these channels adjacent to the endpiece using any appropriate means, for example using inclined channels along the longitudinal axis such as the channels (28b) described and referenced in FIG. 5 or by means of channels formed between the insert (6) and endpiece (4) such as channels (60) in FIG. 10. Of course, we do not leave the scope of the Invention by leaving out insert (6).

The Invention may ideally dissipate the heat at the interface between the stiffener and the flexible conduit in an entirely passive fashion, with water circulation induced by the thermo-syphon phenomenon. However, without leaving the scope of the Invention we may employ forceed-water circulation by mechanical means external to the stiffener.

I claim:

1. A stiffener for fitting to a pipe for use in a marine environment for carrying a heated fluid, wherein the pipe comprises a flexible conduit used in the marine environment, the stiffener comprising a flexible casing located over at least a part of the flexible conduit, and an interface defined between the stiffener and the flexible conduit; and means at the conduit for dissipating heat at the interface between the stiffener and the conduit.

2. The stiffener of claim 1, wherein the means for dissipating heat further comprises means for establishing forced circulation of a cooling fluid inside the stiffener.

3. The stiffener of claim 1, wherein the pipe is adapted for conducting hot fluid circulating in the flexible conduit at between 80° C. and 200° C.

4. The stiffener of claim 1, wherein the stiffener has a length of at least 1.5 M.

5. The stiffener of claim 1, wherein the flexible casing of the stiffener is comprised of a polyurethane.

6. A pipe comprising a flexible conduit for use in a marine environment combined with the stiffener of claim 1.

7. The stiffener of claim 1, further comprising the stiffener being shaped and sized so that an annular gap is located at the interface between the stiffener and the flexible conduit.

8. The stiffener of claim 7, wherein the annular gap is sized between 2 and 16 mm.

9. The stiffener of claim 1, wherein the means for dissipating heat comprise at least one metal insert capable of conducting heat at disposed for conducting heat from the interface between the stiffener and the flexible conduit to the exterior of the stiffener.

10. The stiffener of claim 9, wherein the insert includes a heat sink fin external to the casing and capable of dissipating heat by convection and/or radiation.

11. The stiffener of claim 1, wherein the means for dissipating heat includes an intermediate fitting located between the flexible casing of the stiffener and the flexible conduit.

12. The stiffener of claim 11, wherein the intermediate fitting incorporates at least one water circulation channel.

13. The stiffener of claim 1, wherein the means for dissipating heat comprise at least one water circulation channel inside the casing of the stiffener.

14. The stiffener of claim 13, further comprising the stiffener being shaped and sized so that an annular gap is located at the interface between the stiffener and the flexible conduit.

15. The stiffener of claim 13, wherein the stiffener has a length of at least 1.5 M.

16. The stiffener of claim 13, wherein the flexible casing of the stiffener is comprised of a polyurethane.

17. The stiffener of claim 13, wherein there are a plurality of the water circulation channels in the stiffener at a distance from a stiffener internal surface over the flexible conduit which is less than or equal to the diameter of the channels.

18. A pipe comprising a flexible conduit for use in a marine environment and the stiffener of claim 13.

19. The stiffener of claim 13, further comprising a plurality of the water circulation channels in the stiffener with a spacing apart less than or equal to twice the diameter of the channels.

20. The stiffener of claim 19, wherein the spacing between the water circulation channels is equal to their diameter.

21. The stiffener of claim 13, wherein the water circulation channel opens out to the interface between the stiffener and the conduit.

22. The stiffener of claim 21, further comprising the stiffener being shaped and sized so that an annular gap is located at the interface between the stiffener and the flexible conduit.

23. The stiffener of claim 22, wherein the annular gap is sized between 2 and 16 mm.

* * * * *